3,066,081
MEANS FOR DETECTING GALACTOSE
Edward S. Rorem and James C. Lewis, Berkeley, Calif., assignors to the United States of America as represented by the Secretary of Agriculture
No Drawing. Filed May 5, 1961, Ser. No. 108,215
3 Claims. (Cl. 195—103.5)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a novel diagnostic and analytical implement and to methods for producing and utilizing it. More particularly, the invention concerns such an implement which exhibits a vivid color change when contacted with galactose per se or sugars which contain galactose in chemical combination, e.g., lactose (a beta-galactoside) and raffinose (an alpha-galactoside). The implement of the invention is particularly useful in diagnosing the metabolic disorder known as galactosemia and in determining whether food products can be safely ingested by persons afflicted with this ailment. The implement is also useful as a general analytical tool for detecting the presence of galactose, raffinose, lactose, melibiose, stachyose, etc., in materials of all kinds. Further objects of the invention will be evident from the following description wherein parts and percentages are by weight unless otherwise specified.

It is known that certain children are born with an inability to utilize the sugar galactose. This metabolic disorder causes serious trouble—including mental retardation, development of cataracts, etc.—if the children are fed foods containing galactose, as such, or combined with other sugars as in lactose and raffinose. Such sugars commonly occur in natural products as human milk, cow's milk, goat milk, etc., and in many manufactured items, for example, ice cream, canned puddings, canned fruits and vegetables, pie and cake mixes, etc. The proper feeding of children afflicted with the disorder requires constant vigilance to the end that their food supply is completely free from the sugars in question.

The known techniques for diagnosing the ailment in question and for testing food supplies for the presence of the deleterious sugars are cumbersome and elaborate requiring scientific equipment and a highly trained operator. In accordance with the invention the required tests are simplicity itself and can be performed by anyone of reasonable intelligence. In essence, the invention comprises a test implement—in the preferred form, paper impregnated with certain reagents—which displays a vivid color change when contacted with material containing galactose. The implement can be utilized for diagnosis by testing specimens of urine, blood serum, etc., for the presence of galactose—the presence of this sugar indicating the existence of the ailment. Also, the implement can be used in assaying foods to determine whether they are safe for persons afflicted with galactosemia, that is, whether they are free from galactose as the monosaccharide or combined in oligosaccharides such as lactose. These tests are so simple, requiring merely contact of the implement with the specimen to be tested and observation of the color thereof, that no scientific skill whatever is needed. Thus, for example, the mother of the afflicted child can use the implement routinely in testing all foods offered to her child without requiring any training in chemistry or related sciences.

The implement of the invention comprises essentially porous sheet material impregnated with (1) galactose oxidase, (2) a chromogenic hydrogen donor such as o-tolidine, and (3) peroxidase. When this implement is contacted with galactose in the presence of moisture, hydrogen peroxide is produced by the action of the enzyme galactose oxidase on this sugar. The peroxidase present in the implement converts the hydrogen peroxide to water with accompanying oxidation of the tolidine. The latter change is accompanied by development of a vivid blue color which provides a visual signal that the sugar galactose has contacted the implement. It is thus evident that the use of the implement merely requires contact between the specimen and the implement followed by observation for color change. If the test specimen is dry, it or the implement may be moistened; if the test specimen contains water the contact of the sample and the implement is all that is necessary. It is to be emphasized that the implement of the invention is highly sensitive and selective. Thus it will detect minute concentrations of galactose—as low as 75 parts per million. Moreover, it will not give a color change when contacted with sugars other than galactose. For example, the implement will not give any color change when contacted with high concentrations of such sugars as glucose, mannose, fructose, sucrose, and the sugar-acid galacturonic acid. This selectivity is afforded by the presence of the enzyme galactose oxidase which is highly selective and oxidizes only the sugar galactose.

The preparation of the analytical implement of the invention involves simply impregnating uncoated, absorbent paper or other porous backing material with the reagents mentioned above. These are usually applied as solutions in inert volatile solvents such as water, ethanol, methanol or the like. The concentration of the reagents in the solutions is not critical and may be varied widely. Usually for practical purposes, a concentration of about 0.1 to 10% of each of the reagents is used. After the backing material is impregnated with the solutions, it is dried for example by allowing it to stand in air, by subjecting it to a draft of warm air, or most preferably by holding under vacuum.

Although the backing for the implement is preferably paper of an absorbent and chemically-pure grade such as filter paper, other porous materials may be used, for example, cloth, porous ceramics, asbestos fiber, etc.

The reagent which is employed to develop a color on oxidation is preferably orthotolidine. However, one can use any other organic compound which is essentially colorless and which forms a colored oxidation product in the presence of peroxide and peroxidase. Such compounds may be generically referred to as chromogenic hydrogen donors or chromogenic oxygen acceptors. Illustrative examples of such compounds are listed below.

Benzidine, o-methylbenzidine, m-tolidine, 3,3'-diethyl-4,4'-diaminodiphenyl, o-dianisidine, o-phenylenediamine, m-phenylenediamine, p-phenylenediamine, 2,3-toluylene diamine, 2,4-toluylenediamine, 2,5-toluylenediamine, 2,6-toluylenediamine, 3,4-toluylenediamine, 3,5-toluylenediamine, 1,2,3-triaminobenzene, 1,2,4-triaminobenzene, 2,4,6-triaminobenzene, 4,4'-diaminodiphenyl methane, pyrogallic acid, guaiacol, catechol, hydroquinone, toluhydroquinone, pyrogallol, phloroglucinol, thymol, resorcinol, orcinol, gallic acid, pyrocatechic acid, leucomalachite green, etc.

Where the color-developing reagent is an amine, it is generally employed in its free base from but may also be employed in salt form, for example, as a salt with hydrochloric acid, sulphur acid, acetic acid, citric acid, phthalic acid, or other acid which does not exert an oxidizing effect on the amine.

It is obvious that for calibration purposes, the implement may be standardized to produce a particular level of color when contacted with a galactose solution of specific concentration. Thus the concentration of active ingredients in the implement may be regulated to provide a product which will give the same color when exposed to the same concentration of galactose in any test specimen.

In most cases it is preferred that the materials absorbed on the porous backing include a buffer having a pH of approximate neutrality, that is, a pH about from 6.0 to 8. For such purpose one may employ any of the usual salts or mixtures thereof known to provide such pH, such as sodium phosphate buffers, sodium phthalate buffers, and the like.

The implement of the invention may take various forms, depending on the type of use intended for it. For example, if it is intended that the implement respond only to glactose itself but not to sugars containing galactose in chemical combination, then the essential components of the implement would be galactose oxidase, the chromogenic hydrogen donor, and peroxidase. If on the other hand it is desired that the implement respond to sugars containing galactose in chemical combination as well as galactose itself, then various auxiliary enzymes may be incorporated therein. For example, one may incorporate the enzyme $\beta$-galactosidase together with the primary ingredients (galactose oxidase, chromogenic hydrogen donor and peroxidase). This modification of the invention is responsive to lactose and other $\beta$-galactosides as well as galactose. Thus, if the implement is contacted with lactose the $\beta$-galactosidase will split the lactose into galactose and glucose. The galactose so formed will yield the color signal as described. Another variation is to include the enzyme $\alpha$-galactosidase with the primary ingredients. Such modification of the invention will respond to raffinose and other $\alpha$-galactosides as well as galactose. Thus, the $\alpha$-galactosidase is effective in splitting raffinose into galactose and sucrose, the former providing the visual signal as described. A further variation is to incorporate both $\alpha$- and $\beta$-galactosidase with the primary ingredients to afford an implement which is responsive to galactose, raffinose, lactose and other $\alpha$- or $\beta$-galactosides. Although such supplemental effects are generally achieved through deliberate incorporation of the auxiliary enzymes into the implement, equivalent results may be achieved by employing preparations of galactose oxidase which contain $\alpha$-galactosidase and/or $\beta$-galactosidase as co-biosynthesized products. Such enzyme preparations may be produced as known in the art by culture of various microorganisms including selected strains of *Polyporus circinatus*. By applying conventional enzyme purification techniques to the bacterial preparations, one may obtain pure galactose oxidase or products containing this enzyme plus the galactosidases.

In a preferred embodiment of the invention a hydrophilic colloid is added with the other ingredients on the porous backing material. The colloidal material acts to stabilize and protect the active materials so that the implement can be stored for long periods without loss of activity, uniformity, or sensitivity. Typical examples of colloids which can be used for the purpose are egg white, gelatin, bovine serum albumin, polyethylene glycols (for example, those having a molecular weight from 500 to 50,000), soluble starch, sodium carboxymethyl cellulose, methyl cellulose, polyvinylpyrrolidone, agar, gum tragacanth, gum acacia, gum karaya, carragheen, algin, pectin, dextran, sodium carboxymethyl starch, pentosans, sodium gluten sulphate, sodium gluten phosphate, dried glucose-free egg white, water-soluble soybean protein, and the like. The amount of hydrophilic colloid is not critical; generally it is used in the proportion of about 25 to 250%, based on the weight of galactose oxidase.

The invention is further demonstrated by the following illustrative examples.

Example I

Chemically-pure filter paper was dipped in a 1% solution of o-tolidine in methanol, then dried in air. The paper was then dipped in 0.5 M (pH 7.3) sodium phosphate buffer solution, then dried in air.

Two and one-half parts of galactose oxidase (prepared from *Polyporus circinatus*) and 1 part of horseradish peroxidase were dissolved in 200 parts water. The paper was immersed in this solution then removed and dried in a vacuum desiccator.

The paper so prepared, white in color, was cut into strips for use.

Example II

A sample of human urine was divided into portions and to each was added a measured amount of galactose. These solutions were then applied to the paper strips prepared in Example I by placing a drop of each solution on the strip. It was found that visible blue color was formed with all the solutions including the one of lowest concentration—0.5 mg. galactose per ml.

The procedure as described above was repeated but applying the implement to solutions of galactose in water. In this case it was found that a visible blue color was formed with all the solutions including the one of lowest concentration—0.1 mg. galactose per ml. in this case.

Example III

Chemically-pure filter paper was dipped in a 1.5% solution of o-tolidine in methanol, then dried in air. The paper was then dipped in a solution containing the following ingredients:

| Ingredient: | Proportion, parts |
|---|---|
| Galactose oxidase | 10 |
| Peroxidase (horseradish) | 1 |
| 1 M sodium phthalate buffer (pH 6.2) | 500 |
| Polyethylene glycol having average molecular weight of 6,000 | 25 |

Following dipping in the above solution, the paper was dried in a stream of warm air.

The resulting product, off-white in color, was tested for sensitivity in detecting galactose in human urine. Measured amounts of galactose were added to several portions of urine and each portion was then de-ionized by contact with a mixture of an anion exchange resin and a cation exchange resin. (Such treatment of the urine has been found to increase the sensitivity of the response of the test paper to galactose.) Following this treatment, the test paper was contacted with the urine samples. A visible blue color was formed with solutions containing as little as 0.1 mg. galactose per ml.

Example IV

Chemically-pure filter paper was dipped in a 1% solution of o-tolidine in methanol, then dried in air.

A solution was prepared containing the following ingredients.

| Ingredient: | Proportion, parts |
|---|---|
| Galactose oxidase | 15 |
| Peroxidase (horseradish) | 2.5 |
| Water | 300 |
| 1 M sodium phosphate buffer (pH 7.2) | 200 |
| Dry bovine serum albumin | 25 |

The o-tolidine-impregnated paper was immersed in this solution, removed, drained and freeze-dried under vacuum.

The resulting product, white in color, was tested for sensitivity in detecting galactose in aqueous solution. A visible blue color developed with solutions containing as little as 0.075 mg. galactose per ml.

Example V

Chemically-pure filter paper was dipped in a 1% solution of o-tolidine in methanol then dried in air.

A solution was prepared containing the following materials.

| Ingredients: | Proportion, parts |
|---|---|
| Galactose oxidase | 15 |
| Peroxidase (horseradish) | 2.5 |
| Water | 300 |
| 1 M sodium phosphate buffer (pH 7.2) | 200 |
| Polyethylene glycol having average molecular weight of 20,000 | 30 |

The o-tolidine-impregnated paper was immersed in this solution, removed, drained and freeze-dried under vacuum.

The resulting product, white in color, was tested for sensitivity in detecting galactose in aqueous solution. A visible blue color was developed with solutions containing as little as 0.075 mg. galactose per ml.

Example VI

Chemically-pure filter paper was dipped in a 1% solution of o-tolidine in methanol, then dried in air.

A solution was prepared containing the following materials.

| Ingredient: | Proportion, parts |
|---|---|
| Galactose oxidase | 15 |
| Solution containing β-galactosidase, obtained by grinding cells of an E. coli mutant in water | 500 |
| Peroxidase (horseradish) | 2.5 |
| Water | 300 |
| 1 M sodium phosphate buffer (pH 7.2) | 200 |
| Polyethylene glycol having average molecular weight of 20,000 | 30 |

The o-tolidine-impregnated paper was immersed in this solution, removed, drained and freeze-dried under vacuum. The resulting product, white in color, was tested for sensitivity in detecting lactose in aqueous solution. A visible blue color developed with solutions containing as little as 1 mg. lactose per ml. of solution.

Having thus described the invention, what is claimed is:

1. An analytical implement comprising porous sheet material impregnated with (1) galactose oxidase, (2) a chromogenic hydrogen donor, (3) peroxidase, and (4) a polyethylene glycol having a molecular weight about from 500 to 50,000.

2. A process for preparing an analytical implement which comprises impregnating porous sheet material with a solution containing (1) galactose oxidase, (2) a chromogenic hydrogen donor, (3) peroxidase, and (4) a polyethylene glycol having a molecular weight about from 500 to 50,000.

3. A method for testing urine for the presence of galactose which comprises de-ionizing the urine by treating it with an anion exchange resin and a cation exchange resin and contacting the de-ionized urine with an analytical implement comprising porous sheet material impregnated with (1) galactose oxidase, (2) a chromogenic hydrogen donor, and (3) peroxidase.

References Cited in the file of this patent

UNITED STATES PATENTS

| 2,893,844 | Cook | July 7, 1959 |
| 3,001,915 | Fonner | Sept. 26, 1961 |
| 3,005,714 | Cooper | Oct. 24, 1961 |
| 3,016,292 | Bauer et al. | Jan. 9, 1962 |

OTHER REFERENCES

Sumner et al.: "Chemistry and Methods of Enzymes," 1953, Academic Press, New York, pages 110–111.

Cooper et al. J. Biol. Chem., March 1959, vol. 234, No. 3, pages 445–448.